(12) United States Patent
Bottazzi (10) Patent No.: US 10,636,265 B2
(45) Date of Patent: Apr. 28, 2020

(54) SYSTEMS, METHODS AND ARTICLES TO PREVENT UNAUTHORIZED REMOVAL OF MOBILE PROCESSOR-BASED DEVICES FROM DESIGNATED AREAS

(71) Applicant: Datalogic IP Tech, S.r.l., Bologna (IT)

(72) Inventor: Marco Bottazzi, Ferrara (IT)

(73) Assignee: Datalogic IP Tech, S.r.l., Bologna (IT)

( * ) Notice: Subject to any disclaimer, the term of this patent is extended or adjusted under 35 U.S.C. 154(b) by 7 days.

(21) Appl. No.: 15/351,053

(22) Filed: Nov. 14, 2016

(65) Prior Publication Data

US 2018/0137729 A1    May 17, 2018

(51) Int. Cl.
| | | |
|---|---|---|
| G08B 13/14 | (2006.01) | |
| G08B 13/24 | (2006.01) | |
| H04W 4/021 | (2018.01) | |
| H04B 17/318 | (2015.01) | |
| G08B 29/18 | (2006.01) | |
| H04W 4/80 | (2018.01) | |
| G08B 21/02 | (2006.01) | |
| G08B 29/04 | (2006.01) | |

(52) U.S. Cl.
CPC ..... *G08B 13/2417* (2013.01); *G08B 13/1427* (2013.01); *G08B 13/2462* (2013.01); *G08B 21/0261* (2013.01); *G08B 29/181* (2013.01); *H04B 17/318* (2015.01); *H04W 4/021* (2013.01); *H04W 4/80* (2018.02); *G08B 21/0213* (2013.01); *G08B 21/0247* (2013.01); *G08B 29/046* (2013.01)

(58) Field of Classification Search
CPC ............ G08B 13/2417; G08B 13/2462; G08B 29/181; H04B 17/318; H04W 4/80; H04W 4/008; H04W 4/021; H04W 4/02; Y02D 70/144
See application file for complete search history.

(56) References Cited

U.S. PATENT DOCUMENTS

| | | |
|---|---|---|
| 5,283,550 A | 2/1994 | MacIntyre |
| 6,356,195 B1 | 3/2002 | Olsen et al. |

(Continued)

OTHER PUBLICATIONS

Extended European Search Report, dated Apr. 10, 2018, for European Application No. 17201468.0-1206, 8 pages.

*Primary Examiner* — Joseph H Feild
(74) *Attorney, Agent, or Firm* — Cozen O'Connor (57) ABSTRACT

Systems and methods for preventing the unauthorized removal of mobile processor-based devices from designated areas (e.g., inside of a shopping area). The system may utilize a beacon technology based on a low energy protocol to prevent unauthorized removal of the devices. An anti-theft beacon system which includes an RF beacon transmitter may be positioned proximate an exit of a designated area. Mobile processor-based devices detect beacon signals from the anti-theft beacon system. Responsive to such detection, a device determines that it has been removed from the designated area. The device may then perform one or more anti-theft actions, including operating as a beacon once removed from the designated area. An auxiliary power source may power a beacon of the mobile processor-based device when the mobile processor-based device has been removed from the designated area so that the beacon may still broadcast signals even when a primary power source is disabled.

33 Claims, 6 Drawing Sheets

(56) References Cited

U.S. PATENT DOCUMENTS

| | | |
|---|---|---|
| 8,995,958 B2 | 3/2015 | Kenney |
| 2002/0070874 A1 | 6/2002 | Williams et al. |
| 2003/0209601 A1* | 11/2003 | Chung ............... G06K 7/10336 235/385 |
| 2008/0309389 A1 | 12/2008 | French et al. |
| 2013/0217333 A1 | 8/2013 | Sprigg et al. |
| 2014/0018110 A1* | 1/2014 | Yoakum ................. H04W 4/02 455/456.5 |
| 2016/0027284 A1* | 1/2016 | Kamp .................. G08B 21/182 340/686.6 |
| 2016/0093184 A1* | 3/2016 | Locke ................... H04N 7/183 348/143 |
| 2016/0094947 A1 | 3/2016 | Shen et al. |
| 2017/0064667 A1* | 3/2017 | Mycek ................ H04B 17/318 |

* cited by examiner

SYSTEMS, METHODS AND ARTICLES TO PREVENT UNAUTHORIZED REMOVAL OF MOBILE PROCESSOR-BASED DEVICES FROM DESIGNATED AREAS

BACKGROUND

Technical Field

The present disclosure generally relates to beacon-based anti-theft protection for mobile processor-based devices.

Description of the Related Art

Retailers are constantly searching for new ways to enhance a customer's shopping experience, increase the customer's satisfaction and promote customer loyalty. Self-shopping enables retailers to introduce technology that improves sales and cuts costs by allowing customers to take charge of their own shopping and enjoy the experience. Self-shopping solutions enable shoppers to obtain the information they need without the help of a store associate by accessing in-store devices, displays and kiosks. In some instances, the customer may obtain this information directly on a custom mobile processor-based device while the customer is inside or outside of the store. Such custom mobile processor-based devices may be referred to as personal shopping terminals or self-shopping terminals.

Some of the offerings include applications that enable mobile shopping, product location, price confirmation, gift registry and self-checkout. All of this functionality may be accessible through an in-store communications system (e.g., Wi-Fi®, Bluetooth®), which allows shoppers to receive specific store or product information as well as in-store promotions.

One of the benefits of self-shopping is a fast checkout process which allows the customer to "pre-scan" the items they are purchasing with a portable device, such as a custom self-shopping device, before they approach the register. For example, customers may point a machine-readable symbol reader of a portable device at a product machine-readable symbol (e.g., barcode) and click on a button to scan the symbol, which then shows a description and the price of the product on a display of the portable device. While shopping, customers may also be able to check a list of all products previously scanned and may have access to an up-to-date total of their purchases, additional store offers, promotions and discounts. When a customer's shopping is completed, the customer simply goes to the checkout and pays using self-payment kiosks without having to remove any of the merchandise from the cart or bag. This reduces waiting times considerably.

In self-shopping environments, it is often desirable to track the location of customers as they move through a store or shopping center. For example, it may be desirable to provide customers with directions to products, or to provide customers with information or promotions relating to products that are located nearby. Generally, available spatial location technologies are characterized by different performance factors, such as accuracy, range, passive/active behavior, etc. Each technology may have its own advantages and drawbacks that may match the requirements of a particular application.

The custom mobile processor-based devices provided to customers for use while shopping may be relatively small in size and relatively expensive. Thus, there is a need to prevent accidental or intentional removal (i.e., theft) of such self-shopping devices from designated areas (e.g., inside a store).

BRIEF SUMMARY

A system to detect unauthorized removal of a mobile processor-based device from a designated area may be summarized as including an anti-theft beacon system disposed proximate an exit of the designated area, the anti-theft beacon system including a radio frequency (RF) transmitter which broadcasts RF beacon signals; a mobile processor-based device, including a beacon network interface which includes an RF receiver; at least one nontransitory processor-readable storage medium that stores at least one of processor-executable instructions or data; and at least one processor communicably coupled to the at least one nontransitory processor-readable storage medium and communicatively coupled to the beacon network interface, in operation the at least one processor may receive, via the RF receiver of the beacon network interface, the RF beacon signals from the RF transmitter of the anti-theft beacon system; determine, by the at least one processor, at least one signal characteristic of the received RF beacon signals; determine that the mobile processor-based device has been removed from the designated area based at least in part on the determined at least one signal characteristic; and perform at least one anti-theft action based at least in part on the determination that the mobile processor-based device has been removed from the designated area.

The RF beacon signals may include reference signal strength information, and the at least one processor of the mobile processor-based device may determine at least one signal strength of the received RF beacons signals based at least in part on the received reference signal strength information. The beacon network interface of the mobile processor-based device may include a Bluetooth® Low Energy (BLE) interface. The at least one processor of the mobile processor-based device may monitors a trend in received signal strength indicators (RSSI) of a plurality of RF beacon signals received from the RF transmitter of the anti-theft beacon system. The at least one processor of the mobile processor-based device may detect an improved signal strength trend as the mobile processor-based device is moved toward the beacon system; and determine that the mobile processor-based device has been removed from the designated area based at least in part on the detected improved signal strength trend. The mobile processor-based device may include a primary power source which provides power to the beacon network interface, the at least one processor and the at least one nontransitory processor-readable storage medium; and an auxiliary power source operative to provide power to at least the beacon network interface for a period of time when the primary power source does not provide power to the beacon network interface. The auxiliary power source may include a supercapacitor. The auxiliary power source may include at least one of a non-removable capacitor or a non-removable battery. The mobile processor-based device may include an input interface, and the anti-theft action may include disabling at least a portion of the input interface.

The mobile processor-based device may include a visual output, wherein the at least one processor causes a visual notification to be generated by the visual output based at least in part on the determination that the mobile processor-based device has been removed from the designated area; or an audio output, wherein the at least one processor causes an audio notification to be generated by the audio output based at least in part on the determination that the mobile processor-based device has been removed from the designated area. The mobile processor-based device may include at least one wireless communications interface communicatively coupled to the at least one processor, and the at least one processor of the mobile processor-based device may cause the at least one wireless communications interface to transmit data based at least in part on the determination that the mobile processor-based device has been removed from the designated area. The at least one processor of the mobile processor-based device may cause the at least one wireless communications interface to transmit data indicative of a location of the mobile processor-based device.

The mobile processor-based device may include at least one wireless communications interface communicatively coupled to the at least one processor, and the at least one processor of the mobile processor-based device may disable an application based at least in part on the determination that the mobile processor-based device has been removed from the designated area. The beacon network interface of the mobile processor-based device may include an RF beacon transmitter, and the at least one processor of the mobile processor-based device may cause the RF beacon transmitter to transmit RF beacon signals responsive to the determination that the mobile processor-based device has been removed from the designated area.

The mobile processor-based device may include a primary power source which provides power to the beacon network interface, the at least one processor and the at least one nontransitory processor-readable storage medium; and an auxiliary power source operative to provide power to at least the beacon network interface for a period of time when the primary power source does not provide power to the beacon network interface. The auxiliary power source may be operative to provide power to only the beacon network interface for a period of time when the primary power source does not provide power to the beacon network interface. The auxiliary power source may be a non-removable power source, and may include at least one of a supercapacitor, a capacitor, or a battery.

The system may further include a beacon reader disposed outside of the designated area, the beacon reader including a radio frequency (RF) beacon receiver; at least one nontransitory processor-readable storage medium that stores at least one of processor-executable instructions or data; and at least one processor communicably coupled to the at least one nontransitory processor-readable storage medium and communicatively coupled to the RF transmitter, in operation the at least one processor may cause the RF beacon receiver to receive RF beacon signals from the mobile processor-based device when the RF beacon transmitter of the mobile processor-based device transmits RF beacon signals responsive to the determination that the mobile processor-based device has been removed from the designated area; and provide an indication of a location of the mobile processor-based device based on the RF beacon signals received from the mobile processor-based device. The at least one processor of the beacon reader may provide an indication of distance between the mobile processor-based device and the beacon reader. The beacon reader may include at least one of a smartphone, tablet computer, laptop computer, or a stationary beacon reader.

A method of operation of an anti-theft beacon system to detect unauthorized removal of a mobile processor-based device from a designated area may be summarized as including receiving, by an RF receiver of a beacon network interface of a mobile processor-based device, RF beacon signals from an RF transmitter of an anti-theft beacon system positioned proximate an exit of the designated area; determining, by at least one processor of the mobile processor-based device, at least one signal characteristic of the received RF beacon signals; determining, by the at least one processor of the mobile processor-based device, that the mobile processor-based device has been removed from the designated area based at least in part on the determined at least one signal characteristic; and performing, by the at least one processor of the mobile processor-based device, at least one anti-theft action based at least in part on the determination that the mobile processor-based device has been removed from the designated area.

The method may further include positioning the anti-theft beacon system proximate the exit of the designated area. Receiving RF beacon signals may include receiving RF beacon signals by the RF receiver of the beacon network interface, and the beacon network interface of the mobile processor-based device may include a Bluetooth® Low Energy (BLE) interface. Determining at least one signal characteristic of the received RF beacon signals may include monitoring a trend in receives signal strength indicators (RSSI) of a plurality of RF beacon signals received from the RF transmitter of the anti-theft beacon system.

The mobile processor-based device may include a primary battery source and an auxiliary power source, and may further include powering, by the auxiliary power source, at least the beacon network interface for a period of time when the primary power source does not provide power to the beacon network interface. Powering at least the beacon network interface may include powering at least the beacon network interface by the auxiliary power source, and the auxiliary power source may include at least one of a supercapacitor, a capacitor, or a battery. Performing at least one anti-theft action may include at least one of disabling, by the at least one processor, at least a portion of an input interface of the mobile processor-based device; causing, by the at least one processor, a visual notification to be generated by a visual output; and causing, by the at least one processor, an audio notification to be generated by an audio output. Performing at least one anti-theft action may include causing, by the at least one processor, at least one wireless communications interface of the mobile processor-based device to transmit data based at least in part on the determination that the mobile processor-based device has been removed from the designated area. Causing the at least one wireless communications interface to transmit data may include causing the at least one wireless communications interface to transmit data indicative of a location of the mobile processor-based device. Performing at least one anti-theft action may include causing, by the at least one processor, an RF beacon transmitter of the mobile processor-based device to transmit RF beacon signals responsive to the determination that the mobile processor-based device has been removed from the designated area.

The mobile processor-based device may include a primary battery source and an auxiliary power source, and the method may further include powering, by the auxiliary power source, at least the beacon network interface for a period of time when the primary power source does not provide power to the beacon network interface. Powering at least the beacon network interface may include powering at least the beacon network interface by the auxiliary power source, and the auxiliary power source may include at least one of a supercapacitor, a capacitor, or a battery.

The method may further include receiving, by a beacon reader disposed outside of the designated area, RF beacon signals from the mobile processor-based device when the RF beacon transmitter of the mobile processor-based device transmits RF beacon signals responsive to the determination that the mobile processor-based device has been removed from the designated area; and providing, by the beacon reader, an indication of a location of the mobile processor-based device based on the RF beacon signals received from the mobile processor-based device. Receiving RF beacon signals from the mobile processor-based device may include receiving RF beacon signals from the mobile processor-based device by at least one of a smartphone, tablet computer, laptop computer, or a stationary beacon reader.

A system to detect unauthorized removal of a mobile processor-based device from a designated area may be summarized as including a mobile processor-based device, including a beacon network interface which includes an RF receiver; at least one nontransitory processor-readable storage medium that stores at least one of processor-executable instructions or data; and at least one processor communicably coupled to the at least one nontransitory processor-readable storage medium and communicatively coupled to the beacon network interface, in operation the at least one processor: receives, via the RF receiver of the beacon network interface, RF beacon signals from an anti-theft beacon system positioned proximate an exit of the designated area; determines, by the at least one processor, at least one signal characteristic of the received RF beacon signals; determines that the mobile processor-based device has been removed from the designated area based at least in part on the determined at least one signal characteristic; and performs at least one anti-theft action based at least in part on the determination that the mobile processor-based device has been removed from the designated area.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to systems and methods which prevent the unauthorized removal of mobile processor-based devices from designated areas (e.g., inside of a shopping area). In at least some implementations, the systems discussed herein utilize one or more beacon technologies (e.g., iBeacon®, Eddystone®) based on a low energy protocol (e.g., Bluetooth® Low Energy (BLE)) to prevent unauthorized removal of a plurality of mobile processor-based devices.

Generally, a beacon system which works in advertising mode emits a beacon signal into the surrounding environment. The beacon signal may encode information which includes an identifier of the beacon that is transmitting the beacon signal. For example, the identifier may be a universally unique identifier (UUID). The beacon signal may also encode reference signal strength information or transmit power information, such as the expected level of RSSI at a certain distance (e.g., 1 meter) from the beacon. This beacon signal is received from one or more mobile processor-based devices that acquire the beacon signal and process the signal to estimate the distance between the mobile processor-based device and the beacon system based on the received signal strength of the signal. Generally, the distance between a mobile processor-based device and the beacon system may be determined by calculating the difference between the transmit power of one or more of the signals, as indicated in the transmission, and the received strength of those signals as determined by the mobile processor-based device receiving those signals. The difference may be calculated by determining the decrease in signal strength of one or more of the signals and determining a distance based on the decrease and known loss characteristics through the medium, for example.

In at least some implementations, an anti-theft beacon system which includes an RF beacon transmitter may be positioned proximate an exit of a designated shopping area. A plurality of mobile processor-based devices intended to remain in the designated area may each be equipped with a dedicated or shared beacon network interface which is operative to detect RF beacon signals from the RF beacon transmitter of the anti-theft beacon system. Responsive to detecting the RF beacon signals when the mobile processor-based device is near the anti-theft beacon system and thus near the exit of the designated area, an application executing on the mobile processor-based device may determine that the mobile processor-based device is in the process of being removed from the designated area or has been removed from the designated area. Responsive to such determination, the mobile processor-based device may perform one or more anti-theft actions.

Such anti-theft actions may include locking an input interface (e.g., keys, touchscreen) of the mobile processor-based device, generating an audio output (e.g., alarm sound, voice message), generating a visual output (e.g., flashing light(s), message on a display), or disabling one or more applications executing on the mobile processor-based device, for example.

In at least some implementations, the anti-theft action may include transmitting a beacon signal by the mobile processor-based device. Such beacon signal may be detectable by one or more mobile beacon readers (e.g., smartphone, tablet computer, laptop computer) and/or one or more fixed beacon readers positioned outside of the designated area. As discussed further below, one or more beacon readers may utilize beacon signals received from the mobile processor-based device to provide personnel associated with the designated area, such as employees of a store, with information concerning the location of the mobile processor-based device that has been removed from the designated area, so that the mobile processor-based device may be recovered.

In at least some implementations, the mobile processor-based device may be equipped with an optional auxiliary power source which provides power to at least the beacon network interface for a duration of time (e.g., 2 minutes, 10 minutes, 60 minutes) when the primary power source is disabled. Such may allow the mobile processor-based device to continue transmitting information (e.g., beacon signals, location data) for a period of time even if a user turns puts the mobile processor-based device into an OFF state or removes the primary power source (e.g., battery) from the mobile processor-based device. In implementations which include an auxiliary power source, the auxiliary power source may include one or more capacitors, one or more super capacitors, one or more batteries, etc. The auxiliary power source may be independent of the primary power source, or may store energy received from the primary power source when the primary power source is enabled. Generally, in at least some implementations, the auxiliary power source cannot be easily removed by the user. Such feature may be referred to herein as a "non-removable" auxiliary power source.

Figure 1:
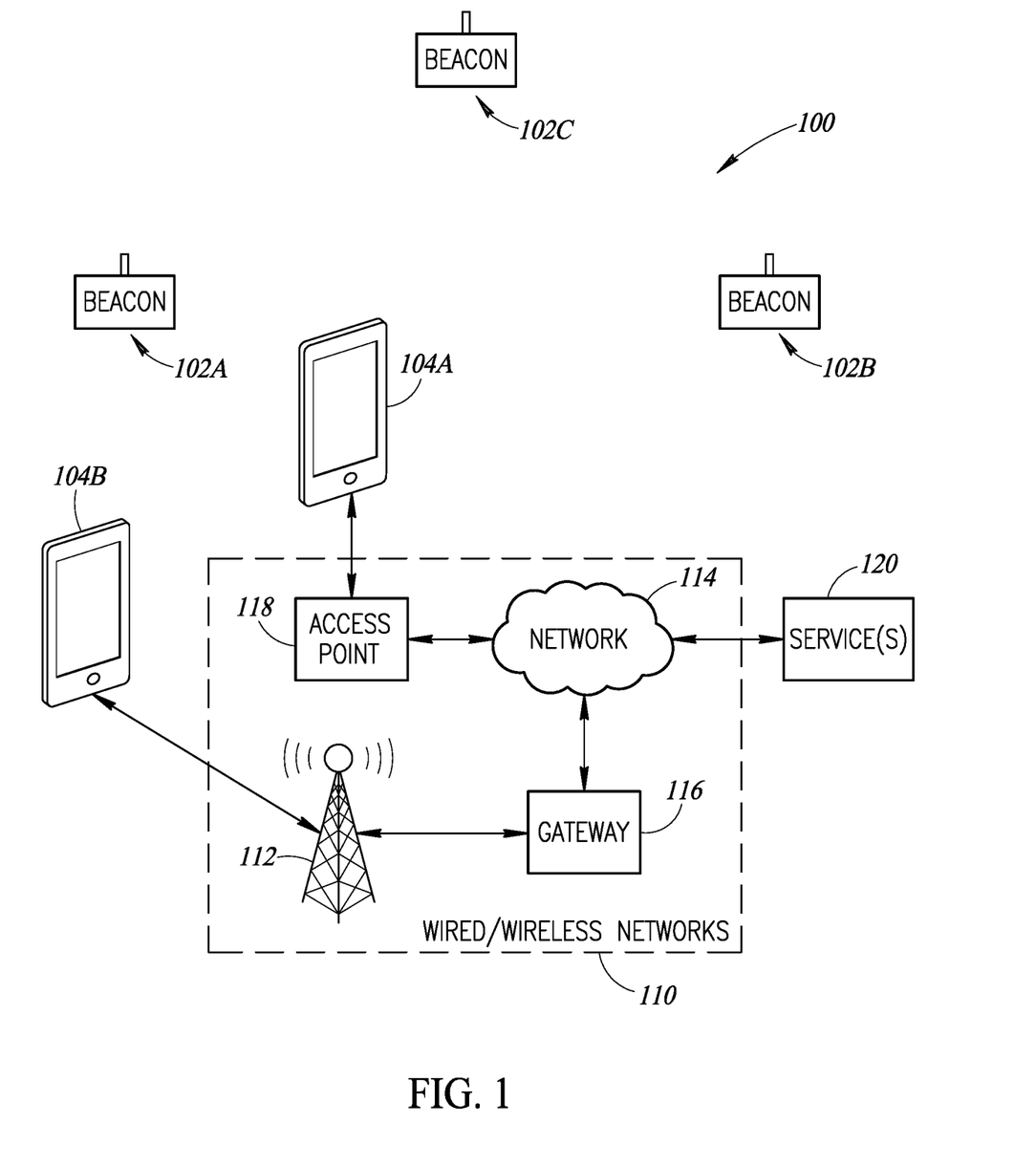
FIG. 1 is a schematic diagram of an example operating environment for a beacon-based anti-theft system, according to one illustrated implementation.

FIG. 1 illustrates an example environment for an anti-theft beacon system 100 which includes a plurality of beacon systems 102A-102C, collectively, beacons 102, and one or more mobile processor-based devices 104A and 104B, collectively mobile processor-based devices 104. As discussed in detail below, in operation one or more processors of the mobile processor-based devices 104 estimates a distance or "range" to one or more of the beacon systems 102 by receiving and processing signals from the beacon systems 102. The environment may be an outdoor environment, such as a sidewalk or an enclosed area, or may be an indoor environment, such as a building (e.g., retail store, shopping center), or may be a combination of outdoor and indoor environments. In addition to walls and a ceiling, the environment of the anti-theft beacon system 100 may include various furniture, structures, customers and other objects. The mobile processor-based devices 104 may be custom personal shopping terminals, for example, or may be any devices intended for use in a designated area, as discussed above.

As discussed further below with reference to FIG. 3, the environment may include one or more designated areas in which the mobile processor-based devices should remain. In such implementations, each of the beacons 102 may be positioned proximate a respective exit of the designated area. As discussed further below, the beacons 102 may be used by the anti-theft beacon system 100 to prevent the unauthorized removable of the mobile processor-based devices 104 from the designated area. Additionally or alternatively, one or more of the beacons 102 may be utilized to determine location information for the mobile processor-based devices 104, which location information may be used to enhance the user's shopping experience.

The mobile processor-based devices 104 may estimate distance using RF signal measurements obtained from RF signals transmitted from the beacons 102 (e.g., beacon transmissions). One example of an RF signal measurement is a received signal strength indicator (RSSI), which is an indication of the power level received by an antenna of the mobile processor-based device 104.

As shown in FIG. 1, the mobile processor-based devices 104 may communicate with other processor-based systems over one or more wired and/or wireless networks 110. As an example, the mobile processor-based device 104B may connect to a wireless network 112, such as a cellular network, which may communicate with a wide area network 114 (e.g., Internet) via a gateway 116. Similarly, the mobile processor-based device 104A may communicate with an access point 118 which provides communication access to the wide area network 114. In some implementations, both voice and data communications may be established over the wired/wireless networks 110. The mobile processor-based devices 104 may also establish peer-to-peer communications with each other by use of one or more wired and/or wireless communication subsystems. Other communication protocols and topologies may also be implemented.

In some implementations, the mobile processor-based devices 104 may communicate with one or more services 120 over the one or more wired and/or wireless networks 110. For example, the one or more services 120 may provide location based navigation information, promotional information, or other location based information to the mobile processor-based devices 104. The one or more services 120 may include at least some of the anti-theft functionality discussed herein. The one or more services 120 may be associated with particular retail stores or retail store chains, particular brands, security services, or any other entity or entities.

Figure 2:
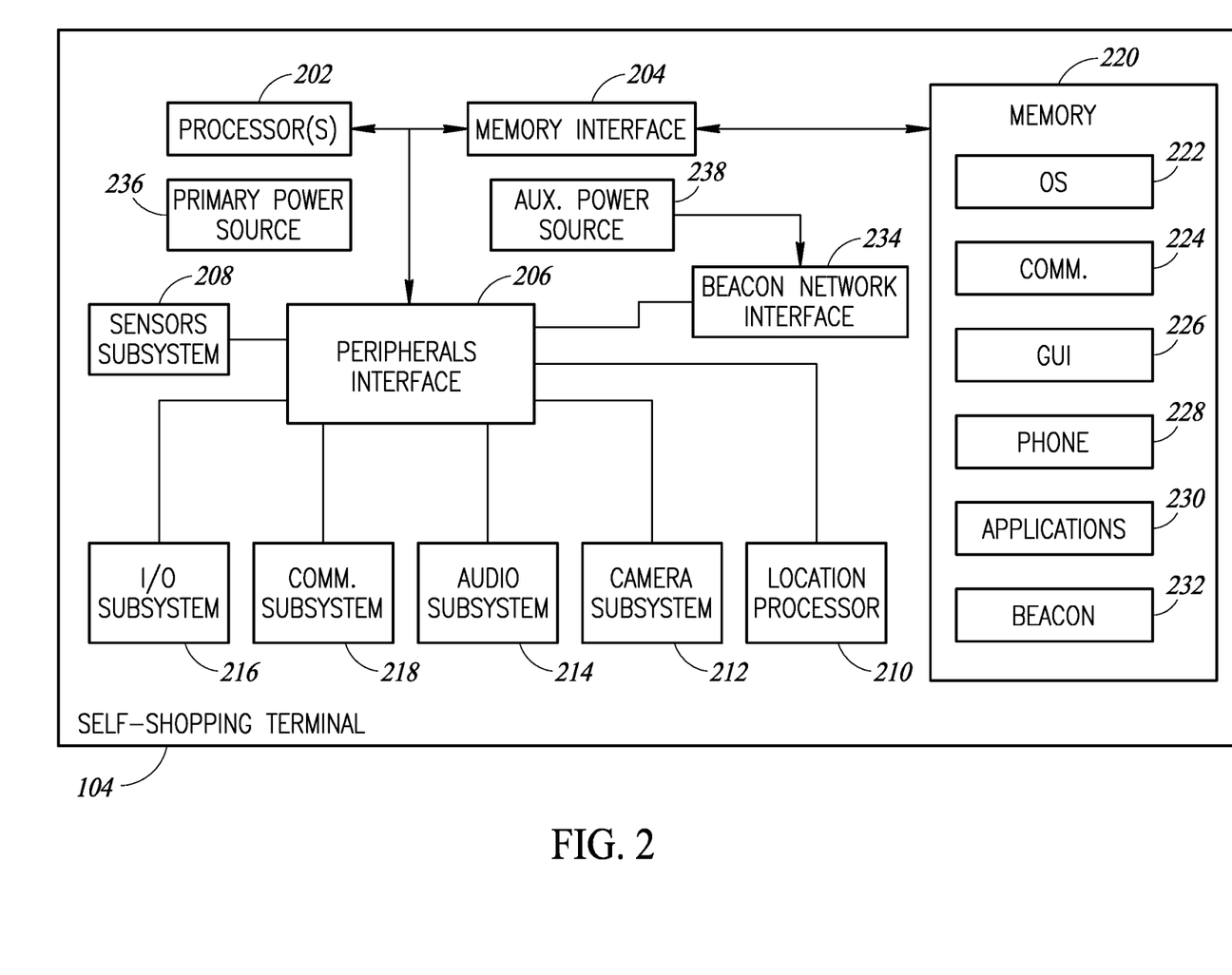
FIG. 2 is a schematic block diagram of an architecture for mobile processor-based device of the beacon-based anti-theft system, according to one illustrated implementation.

FIG. 2 shows an example architecture for the mobile processor-based devices 104 (e.g., self-shopping terminals). The mobile processor-based device 104 may include one or more processors 202, a memory interface 204 and a peripherals interface 206, which may be separate components or may be integrated in one or more integrated circuits. One or more communication buses or signal lines may couple the various components.

As shown, various sensors, devices, and subsystems may be coupled to peripherals interface 206 to facilitate multiple functionalities. For example, a sensor subsystem 208 may be coupled to the peripherals interface 206. The sensor subsystem 208 may include, for example, a motion sensor, light sensor, proximity sensor, temperature sensor, biometric sensor, or other sensing device, to facilitate related functionalities.

The mobile processor-based device 104 may also include a location processor 210 (e.g., GPS receiver, Wi-Fi® baseband processor) operatively coupled to the peripherals interface 206 to provide geo-positioning. The mobile processor-based device 104 may also include a camera subsystem 212 to facilitate camera functions, such as capturing photographs and videos.

The mobile processor-based device 104 may also include an audio subsystem 214 which may include one or more speakers to provide audio output, and one or more microphones to facilitate voice-enabled functions, such as voice recognition, voice replication, digital recording, and telephony functions.

An I/O subsystem 216 of the mobile processor-based device 104 may include a touch controller and/or other input controllers. The touch controller may be coupled to a touch surface to detect contact and movement using any of a number of touch sensitivity technologies, including but not limited to capacitive, resistive, infrared, and surface acoustic wave technologies. The I/O subsystem 216 may include other input controller(s) which may be coupled to other input/control devices, such as one or more keys, buttons, rocker switches, thumb-wheels, infrared ports, USB ports, and/or pointer devices such as a stylus.

Communication and ranging functions may be facilitated through a communication subsystem 218 and/or a beacon network interface 234. The communication subsystem 218 may include one or more wireless communication subsystems. Wireless communication subsystems may include RF receivers and transmitters and/or optical (e.g., infrared) receivers and transmitters. Wired communication subsystems may include port devices, such as a Universal Serial Bus (USB) port or other wired port connection that may be used to establish a wired connection to other computing devices. The specific design and implementation of the communication subsystem 218 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi®), code division multiple access (CDMA) networks, NFC networks, Bluetooth® networks, and/or Bluetooth® Low Energy (BLE) networks.

The beacon network interface 234 may be separate from or integrated with the one or more communication subsystems 218. The beacon network interface 234 may include a processor (e.g., microcontroller) and a radio (e.g., BLE radio), for example. The beacon network interface 234 may be communicatively coupled to the at least one processor 202 so that one or more applications executed by the processor 202 may utilize the beacon network interface 234 to receive and/or broadcast beacons signals.

The memory interface 204 may be operatively coupled to memory 220, which may include high-speed random access memory or non-volatile memory, such as one or more magnetic disk storage devices, one or more optical storage devices, or flash memory. The memory 220 may store an operating system (OS) 222, which may include instructions for handling basic system services and for performing hardware dependent tasks.

The memory 220 may also store communication instructions 224 to facilitate communicating with one or more devices or one or more computers or servers. The memory 220 may also include graphical user interface (GUI) instructions 226 to facilitate graphic user interface processing, including a touch model for interpreting touch inputs and gestures, and phone instructions 228 to facilitate phone-related processes and functions for implementations wherein the mobile processor-based device 104 provides such functionality.

The memory 220 may also store applications 230 which facilitate various functionality, such as electronic messaging, web browsing, media processing, navigation, etc. The memory 220 may also store beacon processing instructions or application 232 which may facilitate the various functionality described herein with reference to FIGS. 1-7. The functionality of the beacon processing application 232 may be separate from or integrated with one or more other applications 230.

As an example, the beacon processing application 232 may run in the background on the mobile processor-based device 104 and may become active only when one or more radio signals having a unique identifier associated with the beacon application 232 or another application 230 (e.g., retail store application) is received. For example, the mobile processor-based device 104 may include a software application which is associated with a specific retail store or retail store chain. The software application may be loaded onto the memory 220 of the mobile processor-based device and may include information about universally unique identifiers (UUIDs) used by the store or the store chain. The software application may monitor the various UUIDs received by the mobile processor-based device 104 and may determine when the mobile processor-based device is receiving one or more UUIDs associated with the retail store or retail store chain, including one or more UUIDs associated with anti-theft beacons. The software application may then determine a location using one or more of the techniques disclosed herein. When the software application determines that the mobile processor-based device 104 has been removed from a designated area based on received beacon signals, the processor 202 may perform one or more anti-theft actions, as discussed further below.

The mobile processor-based device 104 also includes a primary power source 236 which provides power to the various components of the mobile processor-based device 104. For example, the primary power source 236 may be a replaceable or rechargeable battery (e.g., lithium-ion battery) that is removable or non-removable from a housing of the mobile processor-based device 104. As an example, the primary power source may be a rechargeable battery, and the mobile processor-based device 104 may include an interface (e.g., USB®, micro-USB®) which receives DC power to recharge the primary power source.

In at least some implementations, the mobile processor-based device 104 includes an optional auxiliary power source 238 which is operative to power at least the beacon network interface 234 when the primary power source 236 is disabled or otherwise not providing power to the beacon network interface 234. The auxiliary power source 238 may optionally provide power to other components of the mobile processor-based device 104, such as the processor 202, I/O subsystem 216 (e.g., display, speaker), communications subsystem 218, camera subsystem 212, and/or location processor 210, etc., depending on the particular application and the capacity of the auxiliary power source. As discussed further below, the auxiliary power source 238 may allow the mobile processor-based device 104 to continue transmitting information (e.g., beacon signals, location data) for a period of time (e.g., 2 minutes, 10 minutes, 60 minutes) even if a user puts the mobile processor-based device 104 into an OFF state, removes the primary power source 238 from the mobile processor-based device, or otherwise disables the primary power source. The auxiliary power source 238 may include one or more capacitors, one or more super capacitors, one or more batteries, etc. In at least some implementations, the auxiliary power source 268 may be rechargeable and may store energy received from the primary power source 236 and/or received from an external power source (e.g., power converter coupled to AC mains). Generally, the auxiliary power source should not be able to be easily removed by the user, to prevent tampering.

The respective transmitters of the beacons 102 (FIG. 1) may broadcast or emit a wide variety of types of signals in accordance with the techniques and methods described herein. In one example, the transmitters of the beacons 102 comprise Bluetooth® or Bluetooth® Low Energy (BLE) transmitter modules. In some configurations, BLE may provide unique benefits. In one example, the lower power requirement of BLE may enable the beacons 102 to be powered by a battery for a relatively longer period of time. In addition, on some mobile processor-based devices 104, the RSSI for received BLE signals may be more readily accessible to the device or software applications than is the RSSI for other types of received radio signals, such as Wi-Fi®. Further, in implementations wherein the mobile processor-based devices act as beacon transmitters upon their unauthorized removal from a designated area, BLE enables the mobile processor-based devices to be powered by an auxiliary power source (e.g., supercapacitor) for a period of time (e.g., 2 minutes, 10 minutes, 90 minutes).

In the case of BLE, each of the beacons 102 may transmit on one of three BLE advertising channels which fall in the 2.4 GHz ISM band. The three advertising channels, channels 37, 38, and 39 from the Bluetooth® 4.0 protocol, correspond to frequencies 2402 MHz, 2426 MHz, and 2480 MHz, respectively, which produces signals having wavelengths of 12.5 cm, 12.4 cm, and 12.1 cm, respectively.

In one or more implementations, BLE beacons may be operated in what is known as the BLE Proximity Profile, in which data is broadcast one-way, from each BLE transmitter outwards on one of these three channels. The data payload may include a unique identifier for the transmitter, such as a Universally Unique Identifier (UUID). The unique identifier may be used by a receiving device to distinguish the signals from each other, to distinguish one beacon from another, to determine an identity associated with the beacon, and/or for other purposes. In addition, the transmission may include information indicating the transmit power of the signal. In some cases, the transmit power is an RSSI, as discussed above. The unique identifier, the transmit power, and/or any other information included in the signal may be modulated or encoded using one or more of any known modulation or encoding techniques.

Figure 3:
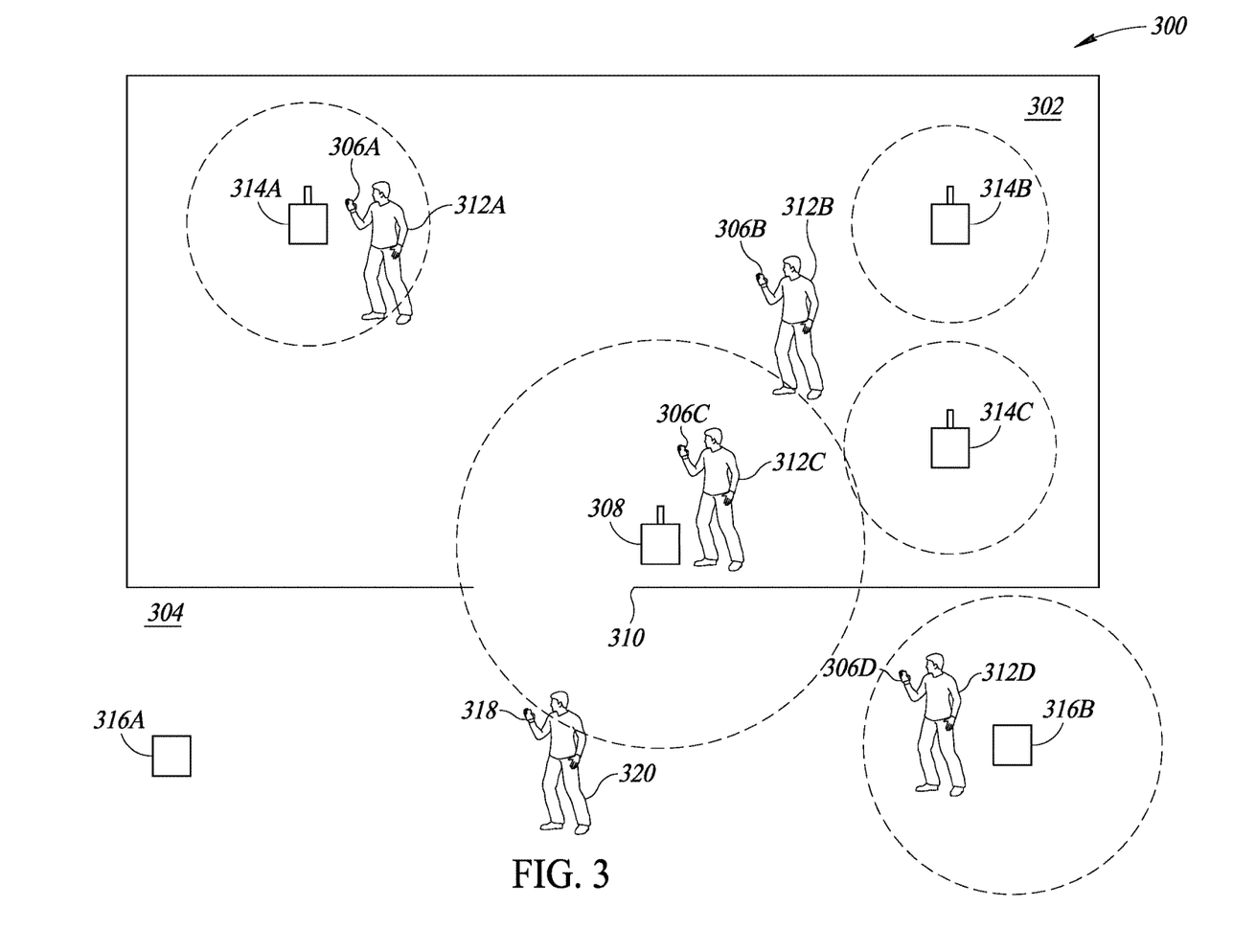
FIG. 3 is a schematic diagram of an environment in which a beacon-based anti-theft system may be deployed in a designated area, according to one illustrated implementation.

FIG. 3 is a schematic diagram of an environment 300 in which a beacon-based anti-theft system may be deployed to prevent mobile processor-based devices 306A-306D (e.g., self-shopping terminals, smartphones, tablet computers, laptop computers, wearable devices) from being moved from inside a designated area 302 to an unauthorized area 304 which is outside the designated area. The beacon-based anti-theft system includes an anti-theft beacon system 308 positioned proximate an exit 310 between the designated area 302 and the unauthorized area 304. In at least some implementations, more than one anti-theft beacon system 308 may be positioned proximate the exit 310. Additionally, for designated areas with multiple exits, one or more anti-theft beacon systems 308 may be positioned proximate each of the multiple exits.

The designated area 304 may be an indoor or outdoor retail store, shopping center, conference room, library, computer lab, office space, classroom, or any other type of area in which mobile processor-based devices are intended to remain. The mobile processor-based devices 306 may be any type of mobile processor-based device which is required to be kept within the designated area 302. For example, the mobile processor-based devices 306A-306D may be self-shopping terminals which are temporarily provided to customers 312A-312D, respectively, for use while shopping inside the designated area 302. As another example, the mobile processor-based devices 306A-306D may be mobile computers provided to students for use in a classroom. These examples are provided for illustrative purposes and should be considered as non-limiting.

In addition to the anti-theft beacon 308 that is positioned proximate the exit 310, the environment 300 may also include a number of other beacons 314A-314C positioned throughout the designated area 302. Such other beacons 314A-314C may be used for location determination purposes and/or for anti-theft purposes. In at least some implementations, the anti-theft beacon system may further include a number of fixed beacon readers 316A-316B disposed at various locations in the unauthorized area 304. For example, in implementations wherein the designated area 302 is a retail store, one or more fixed beacon readers 316 may be positioned on a sidewalk outside the retail store or in a parking lot adjacent the retail store.

In operation, the anti-theft beacon 308 that is positioned proximate the exit 310 may from time-to-time (e.g., every 100 milliseconds, every 2 seconds) broadcast beacon signals. The beacon signals may encode information which includes an identifier of the beacon 308 and reference signal strength information or transmit power information, such as the expected level of RSSI at a certain distance (e.g., 1 meter) from the beacon.

Mobile processor-based devices 306 which are "in range" of the beacon 308 are capable of detecting the broadcast beacon signals and, based on the received signal strength of the incoming signal and the received reference signal strength information, to evaluate the distance between the mobile processor-based device and the beacon 308. Generally, the distance between a mobile processor-based device 306 and the beacon 308 may be determined by calculating the difference between the transmit power of one or more of the signals, as indicated in the transmission, and the received strength of those signals as determined by the mobile processor-based device receiving those signals. The difference may be calculated by determining the decrease in signal strength of one or more of the signals and determining a distance based on the decrease and known loss characteristics through the medium, for example.

As discussed above, the mobile processor-based devices 306 are equipped with a dedicated or shared beacon network interface which detects RF beacon signals from the RF beacon transmitter of the beacon system 308. Responsive to detecting the RF beacon signals, an application executing on the mobile processor-based devices 306 may determine that the mobile processor-based device is in the process of being removed from the designated area or has been removed from the designated area. Responsive to such a determination, the mobile processor-based device may perform one or more anti-theft actions.

Such anti-theft actions may include locking an input interface (e.g., keys, touchscreen) of the mobile processor-based device, generating an audio output (e.g., alarm, voice message), generating a visual output (e.g., flashing lights, message on a display), or disabling one or more applications executing on mobile processor-based device 306, for example.

In at least some implementations, the anti-theft action may include broadcasting a beacon signal by the mobile processor-based device. Such beacon signal may be detectable by one or more mobile beacon readers 318 (e.g., smartphone, tablet computer, laptop computer) operated an associate 320 (e.g., employee) of the designated area 302 and/or one or more fixed beacon readers 316 positioned in the unauthorized area 304 outside of the designated area 302. As discussed further below, the beacon readers 316 and 318 may utilize beacon signals received from the mobile processor-based devices 306 to provide personnel 320 with information concerning the location of the mobile processor-based device 306, so that the mobile processor-based device may be located and recovered.

In at least some implementations, the mobile processor-based devices 306 may be equipped with an auxiliary power source which provides power to at least the beacon network interface for a duration of time (e.g., 2 minutes, 10 minutes, 60 minutes) when the primary power source is disabled. Such may allow the mobile processor-based device to continue transmitting beacon signals for a period of time even if a user turns the mobile processor-based device 306 OFF or removes the primary power source (e.g., a battery) from the mobile processor-based device.

Figure 4:
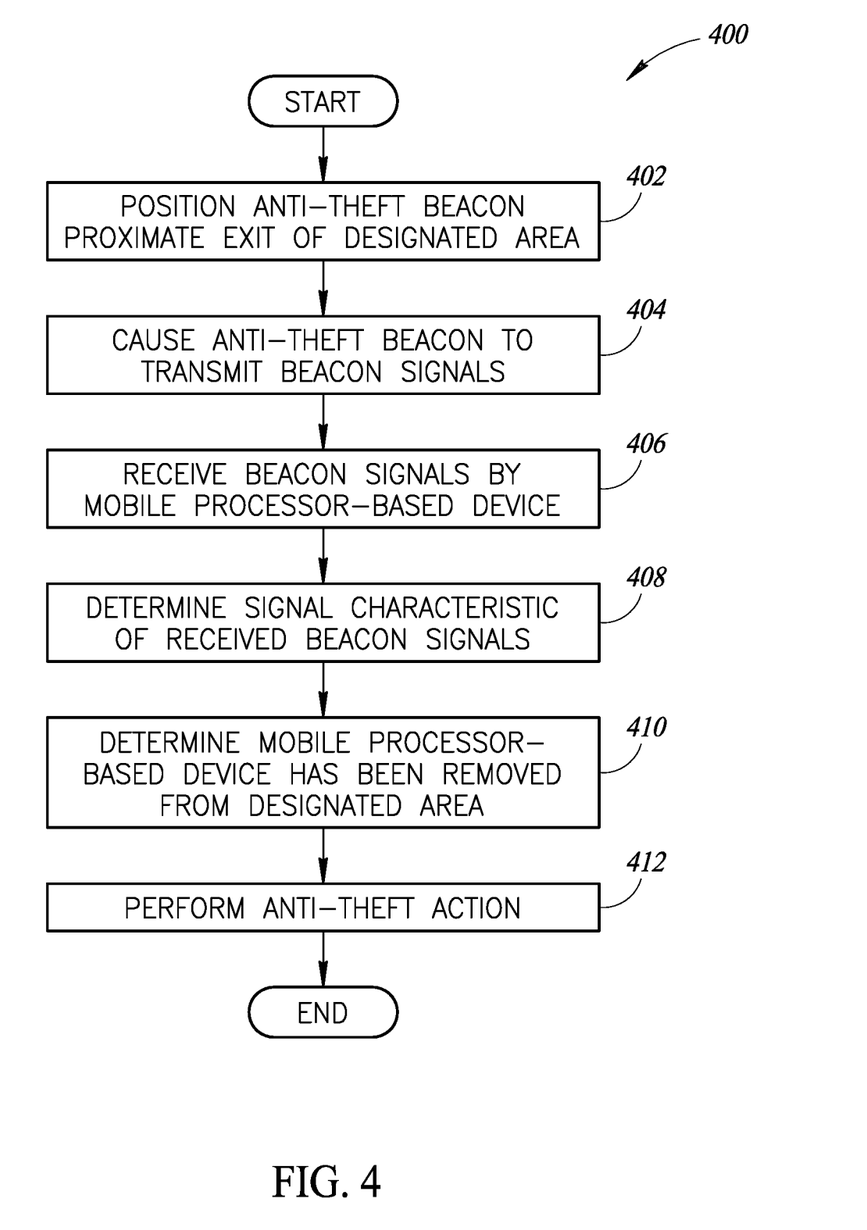
FIG. 4 is a flow diagram of a method of operating a beacon-based anti-theft system to prevent the unauthorized removal of mobile processor-based devices from a designated area, according to one illustrated implementation.

FIG. 4 is a flow diagram of a method 400 of operating a beacon-based anti-theft system to prevent the unauthorized removal of mobile processor-based devices from a designated area. Generally, a plurality of users may have borrowed or rented a respective plurality of mobile processor-based devices for use only in the designated area (e.g., while shopping in the designated area).

At 402, at least one anti-theft beacon may be positioned proximate an exit of the designated area which separates the designated area from an unauthorized area in which the mobile processor-based devices are not allowed to be moved. As discussed above, the anti-theft beacon positioned proximate the exit may include at least one processor and at least one RF transmitter.

At 404, from time-to-time the RF transmitter of the anti-theft beacon broadcasts RF beacon signals. In at least some implementations, the anti-theft beacon broadcasts beacon signals using a beacon protocol (e.g., iBeacon®, Eddystone®) which utilizes a low energy wireless protocol (e.g., BLE).

At 406, responsive to a user of a mobile processor-based device carrying the mobile processor-based device proximate (e.g., within 10 meters, within 20 meters) to the anti-theft beacon, an RF beacon receiver of the mobile processor-based device receives the RF beacon signals from the anti-theft beacon.

At 408, at least one processor of the mobile processor-based device may determine at least one signal characteristic of the receive beacon signals. For example, the at least one processor may monitor a trend of the RSSI of the received beacon signals to determine a pattern (e.g., increasing, decreasing) of the RSSI over time as the user moves the mobile processor-based device toward the exit of the designated area and thus toward the anti-theft beacon.

At 410, the at least one processor of the mobile processor-based device may determine that the mobile processor-based device has been moved outside of the designated area into an authorized area based on the determined at least one signal characteristic of the received beacon signals. For example, the at least one processor of the mobile processor-based device may evaluate an improved RSSI as the user carries the mobile processor-based device toward the exit of the designated area, and thus toward the anti-theft beacon positioned proximate the exit, until a maximum RSSI value is detected which indicates the mobile processor-based device has reached the exit.

At 412, responsive to determining that the mobile processor-based device has been removed from the designated area, the at least one processor of the mobile processor-based device may perform one or more anti-theft actions. Examples of such anti-theft actions are provided below with reference to FIGS. 5-7.

Figure 5:
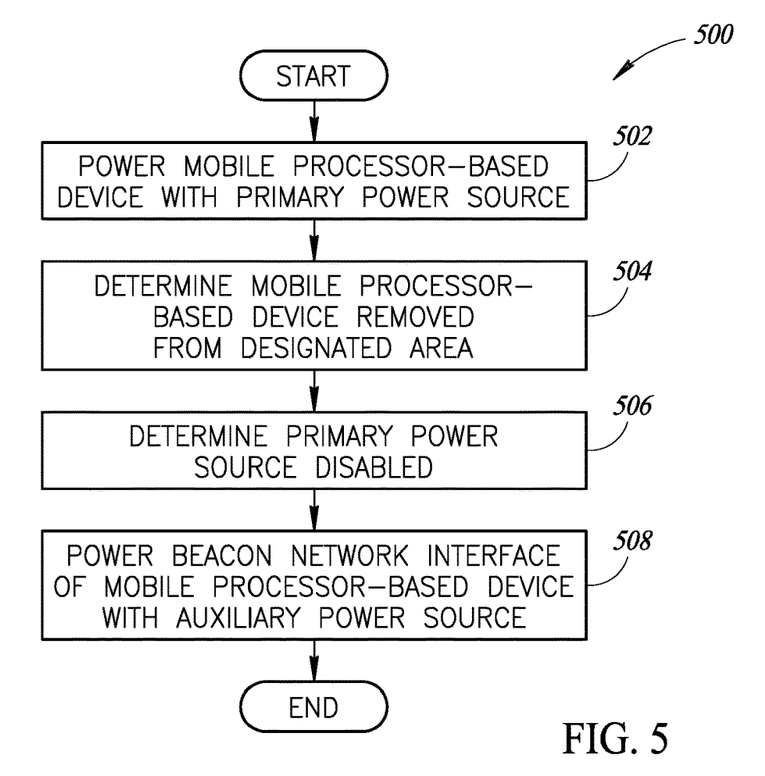
FIG. 5 is a flow diagram of a method of operating a beacon-based anti-theft system to prevent the unauthorized removal of a mobile processor-based device from a designated area when a primary power source of the mobile processor-based device has been disabled, according to one illustrated implementation.

FIG. 5 is a flow diagram of a method 500 of operating a beacon-based anti-theft system to prevent the unauthorized removal of a mobile processor-based device from a designated area when a primary power source of the mobile processor-based device has been disabled.

At 502, the mobile processor-based device may be powered with a primary power source, such as a removable and/or rechargeable battery, during normal operation of the mobile processor-based device. At 504, the at least one processor of the mobile processor-based device may determine that the mobile processor-based device has been removed from a designated area. Such may be determined using the method 400 discussed above and shown in FIG. 4, for example.

At 506, it may be determined that the primary power source of the mobile processor-based device has been disabled. For example, in implementations wherein the primary power source comprises a removable battery, it may be determined that the user has removed the battery. Additionally or alternatively, it may be determined that the user has placed the mobile processor-based device in a powered off state.

At 508, responsive to the primary power source being disabled, a beacon network interface of the mobile processor-based device may be powered using an auxiliary power source. In at least some implementations, acts 506 and 508 may be implemented autonomously, for example, by providing circuitry which automatically powers the beacon network interface using the auxiliary power source when the primary power source is disabled. The auxiliary power source may include one or more capacitors, one or more supercapacitors, one or more batteries, etc. Thus, even though the user may have disabled the primary power source, the mobile processor-based device is still operative to send and/or receive beacon signals via the beacon network interface. In at least some implementations, the auxiliary power source may additionally provide power to one or more other components of the mobile processor-based device, such as one or more processors, I/O subsystems (e.g., display, speaker), communications subsystems (e.g., Wi-Fi, cellular, Bluetooth®), a camera subsystem, a location processor or subsystem, etc.

Figure 6:
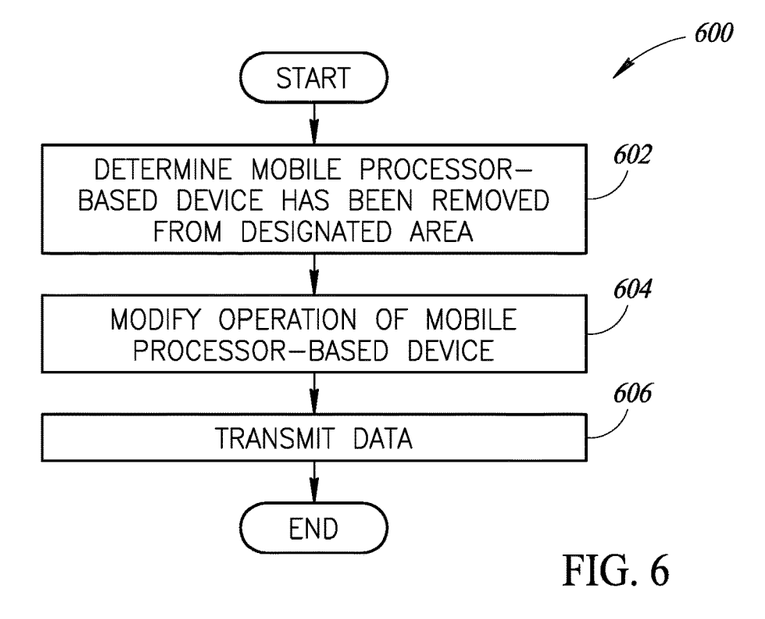
FIG. 6 is a flow diagram of a method of operating a beacon-based anti-theft system to prevent the unauthorized removal of a mobile processor-based device from a designated area, wherein responsive to being removed from the designated area, the mobile processor-based device modifies its operation and/or transmits data, according to one illustrated implementation.

FIG. 6 is a flow diagram of a method 600 of operating a beacon-based anti-theft system to prevent the unauthorized removal of a mobile processor-based device from a designated area. At 602, the at least one processor of the mobile processor-based device determines that the mobile processor-based device has been removed from a designated area. Such may be determined using the method 400 discussed above and shown in FIG. 4, for example.

At 604, responsive to determining that the mobile processor-based device has been removed from the designated area, the at least one processor of the mobile processor-based device modifies the operation of the mobile processor-based device. Such modification may include locking an input interface (e.g., keys, touchscreen) of the mobile processor-based device, generating an audio output (e.g., alarm, voice message), generating a visual output (e.g., flashing lights, message on a display), or disabling one or more applications executing on the mobile processor-based device, for example.

At 606, responsive to determining that the mobile processor-based device has been removed from the designated area, the at least one processor may additionally or alternatively transmit or broadcast data. For example, the at least one processor may transmit data over a suitable wireless network (e.g., Wi-Fi, cellular), which data may be received by personnel associated with the designated area, such as an employee of a store. As an example, the data may include location information (e.g., GPS data, Wi-Fi location data, beacon location data) available from the mobile processor-based device which may assist personnel in locating the mobile processor-based device after the mobile processor-based device has been removed from the designated area.

Figure 7:
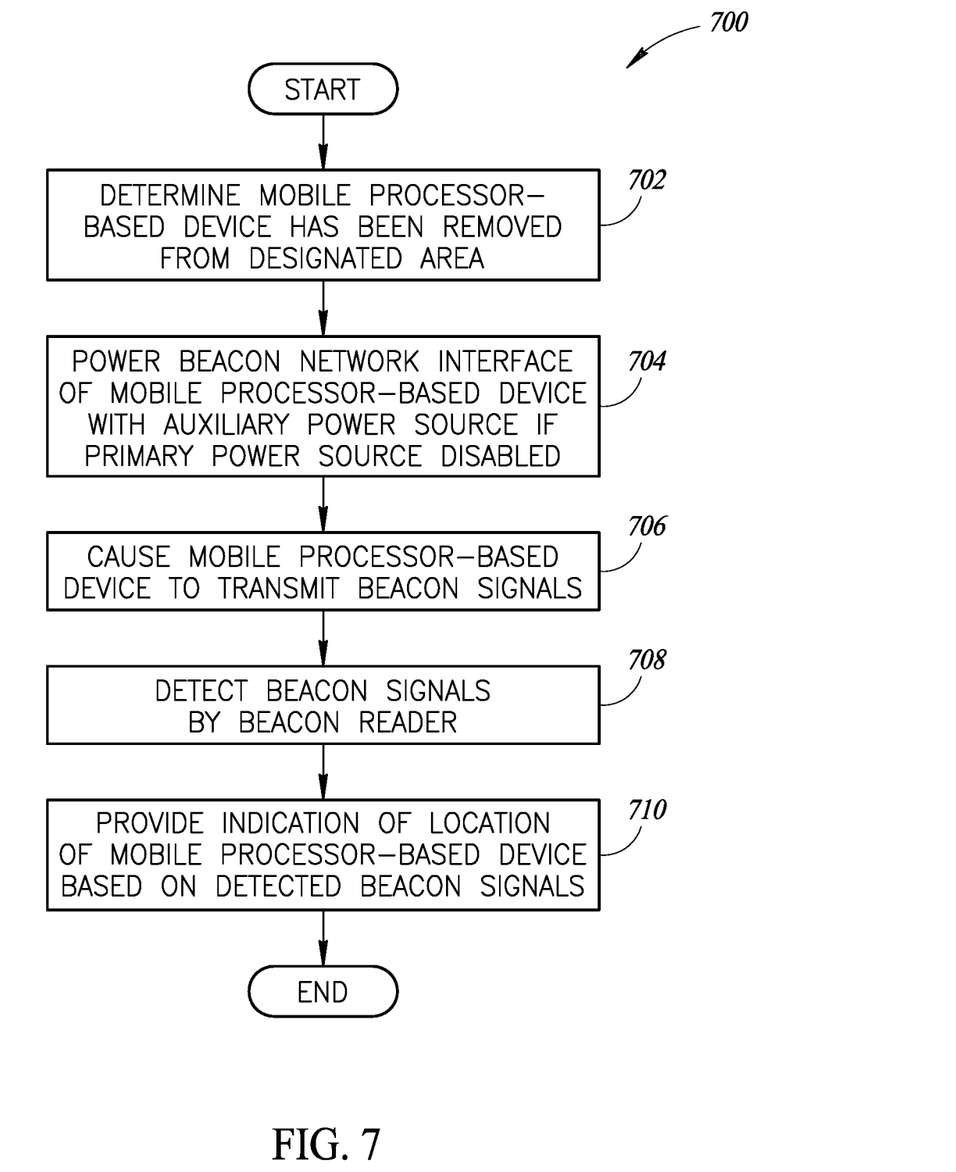
FIG. 7 is a flow diagram of a method of operating a beacon-based anti-theft system to prevent the unauthorized removal of mobile processor-based devices from a designated area, wherein responsive to being removed from the designated area, the mobile processor-based device begins transmitting beacon signals detectable by one or more beacon readers, according to one illustrated implementation.

FIG. 7 is a flow diagram of a method 700 of operating a beacon-based anti-theft system to prevent the unauthorized removal of mobile processor-based devices from a designated area, wherein responsive to being removed from the designated area, the mobile processor-based device begins transmitting beacon signals detectable by one or more beacon readers.

At 702, the at least one processor of the mobile processor-based device determines that the mobile processor-based device has been removed from a designated area. Such may be determined using the method 400 discussed above and shown in FIG. 4, for example.

At 704, the at least one processor of the mobile processor-based device optionally powers a beacon network interface of the mobile processor-based device with an auxiliary power source if a primary power source of the mobile processor-based device has been disabled (e.g., battery removed, mobile processor-based device powered down). Such feature allow the beacon network interface to operate for a period of time even when the primary power source of the mobile processor-based device has been disabled.

At 706, from time-to-time (e.g., every 50 milliseconds, every 2 seconds, every 20 seconds), the beacon network interface broadcasts beacon signals when the mobile processor-based device is outside of the designated area (i.e., in an unauthorized area).

At 708, at least one beacon reader detects the beacon signals broadcast by the mobile processor-based device. For example, personnel associated with the designated area, such a store employee, may carry a mobile processor-based device (e.g., smartphone, tablet computer) which functions as a beacon reader to detect the beacon signals broadcast by the mobile processor-based device which has been removed from the unauthorized area. The beacon reader may determine an estimated location of the mobile processor-based device based on the received beacon signals, using any suitable method (e.g., RSSI strength).

At 710, the beacon reader may present such location information to the personnel so that the personnel may locate the mobile processor-based device. For example, the beacon reader may present a map on a display which provides an indication of the present location of the mobile processor-based device that has been removed from the designated area.

In at least some implementations, a number of fixed and/or mobile beacon readers may be positioned outside of the authorized area. In such implementations, one or more of the beacon readers may detect beacon signals broadcast from the mobile processor-based device and utilize such signals to provide location information to personnel associated with the designated area. Various location techniques, including RSSI strength, bilateration, triangulation, etc., may be used to determine the location of the mobile processor-based device which has been removed from the designated area. The particular technology implemented may be dependent on the number of beacon readers that are concurrently able to detect beacon signals broadcast from the mobile processor-based device. Thus, using such location information, the personnel may be able to locate and/or recover the mobile processor-based device that has been removed from the designated area.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A system to detect unauthorized removal of a mobile processor-based device from a designated area, the system comprising:
   an anti-theft beacon system disposed proximate an exit of the designated area, the anti-theft beacon system comprising:
      a radio frequency (RF) transmitter which broadcasts RF beacon signals;
   a mobile processor-based device, comprising:
      a beacon network interface which includes an RF receiver;
      a primary power source which provides power to the beacon network interface, at least one processor and at least one nontransitory processor-readable storage medium of the mobile processor-based device; and
      an auxiliary power source operative to provide power to at least the beacon network interface for a period of time when the primary power source does not provide power to the beacon network interface, wherein the primary power source ceases to provide power to the beacon network interface and the auxiliary power source provides power to the beacon network interface responsive to a user selecting an off state for the mobile processor-based device;
      said at least one nontransitory processor-readable storage medium storing at least one of processor-executable instructions or data; and
      said at least one processor communicably coupled to the at least one nontransitory processor-readable storage medium and communicatively coupled to the beacon network interface, in operation the at least one processor:
         receives, via the RF receiver of the beacon network interface, the RF beacon signals from the RF transmitter of the anti-theft beacon system;
         monitors a trend in received signal strength indicators (RSSI) of a plurality of RF beacon signals received from the RF transmitter of the anti-theft beacon system;
         detects an improved RSSI trend as the mobile processor-based device is moved toward the beacon system;
         determines that the mobile processor-based device has been removed from the designated area based at least in part on the detected improved RSSI trend; and
         performs at least one anti-theft action based at least in part on the determination that the mobile processor-based device has been removed from the designated area,
   wherein the RF beacon signals encode reference signal strength information, and the at least one processor of the mobile processor-based device decodes the RF beacon signals to obtain the reference signal strength information and determines a distance between the mobile processor-based device and the beacon system based at least in part on the RSSI and the obtained reference signal strength information.

2. The system of claim 1 wherein the beacon network interface of the mobile processor-based device comprises a Bluetooth® Low Energy (BLE) interface.

3. The system of claim 1 wherein the auxiliary power source comprises a supercapacitor.

4. The system of claim 1 wherein the auxiliary power source comprises at least one of a non-removable capacitor or a non-removable battery.

5. The system of claim 1 wherein the mobile processor-based device comprises an input interface, and the anti-theft action comprises disabling at least a portion of the input interface.

6. The system of claim 1 wherein the mobile processor-based device comprises:
   a visual output, wherein the at least one processor causes a visual notification to be generated by the visual output based at least in part on the determination that the mobile processor-based device has been removed from the designated area; or
   an audio output, wherein the at least one processor causes an audio notification to be generated by the audio output based at least in part on the determination that the mobile processor-based device has been removed from the designated area.

7. The system of claim 1 wherein the mobile processor-based device comprises at least one wireless communications interface communicatively coupled to the at least one processor, and the at least one processor of the mobile processor-based device:
   causes the at least one wireless communications interface to transmit data based at least in part on the determination that the mobile processor-based device has been removed from the designated area.

8. The system of claim 7 wherein the at least one processor of the mobile processor-based device causes the at least one wireless communications interface to transmit data indicative of a location of the mobile processor-based device.

9. The system of claim 1 wherein the mobile processor-based device comprises at least one wireless communications interface communicatively coupled to the at least one processor, and the at least one processor of the mobile processor-based device:
disables an application based at least in part on the determination that the mobile processor-based device has been removed from the designated area.

10. The system of claim 1 wherein the beacon network interface of the mobile processor-based device comprises an RF beacon transmitter, and the at least one processor of the mobile processor-based device:
causes the RF beacon transmitter to transmit RF beacon signals responsive to the determination that the mobile processor-based device has been removed from the designated area.

11. The system of claim 10 wherein the auxiliary power source is operative to provide power to only the beacon network interface for a period of time when the primary power source does not provide power to the beacon network interface.

12. The system of claim 10 wherein the auxiliary power source is a non-removable power source, and comprises at least one of a supercapacitor, a capacitor, or a battery.

13. The system of claim 10, further comprising:
a beacon reader disposed outside of the designated area, the beacon reader comprising:
a radio frequency (RF) beacon receiver;
at least one nontransitory processor-readable storage medium that stores at least one of processor-executable instructions or data; and
at least one processor communicably coupled to the at least one nontransitory processor-readable storage medium and communicatively coupled to the RF transmitter, in operation the at least one processor:
causes the RF beacon receiver to receive RF beacon signals from the mobile processor-based device when the RF beacon transmitter of the mobile processor-based device transmits RF beacon signals responsive to the determination that the mobile processor-based device has been removed from the designated area; and
provides an indication of a location of the mobile processor-based device based on the RF beacon signals received from the mobile processor-based device.

14. The system of claim 13 wherein the at least one processor of the beacon reader:
provides an indication of distance between the mobile processor-based device and the beacon reader.

15. The system of claim 13 wherein the beacon reader comprises at least one of a smartphone, tablet computer, laptop computer, or a stationary beacon reader.

16. A method of operation of an anti-theft beacon system to detect unauthorized removal of a mobile processor-based device from a designated area, the method comprising:
receiving, by an RF receiver of a beacon network interface of a mobile processor-based device, RF beacon signals from an RF transmitter of an anti-theft beacon system positioned proximate an exit of the designated area;
providing power, via a primary power source of the mobile processor-based device, to the beacon network interface, at least one processor and at least one nontransitory processor-readable storage medium of the mobile processor-based device;
providing power, via an auxiliary power source of the mobile processor-based device, to at least the beacon network interface for a period of time when the primary power source of the mobile processor-based device does not provide power to the beacon network interface, wherein the primary power source of the mobile processor-based device ceases to provide power to the beacon network interface and the auxiliary power source of the mobile processor-based device provides power to the beacon network interface responsive to a user selecting an off state for the mobile processor-based device;
determining, by the at least one processor of the mobile processor-based device, at least one signal characteristic of the received RF beacon signals, wherein determining at least one signal characteristic of the received RF beacon signals comprises monitoring a trend in receives signal strength indicators (RSSI) of a plurality of RF beacon signals received from the RF transmitter of the anti-theft beacon system;
detecting an improved RSSI trend as the mobile processor-based device is moved toward the beacon system;
determining, by the at least one processor of the mobile processor-based device, that the mobile processor-based device has been removed from the designated area based at least in part on the on the detected improved RSSI trend; and
performing, by the at least one processor of the mobile processor-based device, at least one anti-theft action based at least in part on the determination that the mobile processor-based device has been removed from the designated area,
wherein the RF beacon signals encode reference signal strength information, and the at least one processor of the mobile processor-based device decodes the RF beacon signals to obtain the reference signal strength information and determines a distance between the mobile processor-based device and the beacon system based at least in part on the RSSI and the obtained reference signal strength information.

17. The method of claim 16, further comprising:
positioning the anti-theft beacon system proximate the exit of the designated area.

18. The method of claim 16 wherein receiving RF beacon signals comprises receiving RF beacon signals by the RF receiver of the beacon network interface, and the beacon network interface of the mobile processor-based device comprises a Bluetooth® Low Energy (BLE) interface.

19. The method of claim 16 wherein powering at least the beacon network interface comprises powering at least the beacon network interface by the auxiliary power source, and the auxiliary power source comprises at least one of a supercapacitor, a capacitor, or a battery.

20. The method of claim 16 wherein performing at least one anti-theft action comprises at least one of:
disabling, by the at least one processor, at least a portion of an input interface of the mobile processor-based device;
causing, by the at least one processor, a visual notification to be generated by a visual output; and
causing, by the at least one processor, an audio notification to be generated by an audio output.

21. The method of claim 16 wherein performing at least one anti-theft action comprises:
causing, by the at least one processor, at least one wireless communications interface of the mobile processor-based device to transmit data based at least in part on the determination that the mobile processor-based device has been removed from the designated area.

22. The method of claim 21 wherein causing the at least one wireless communications interface to transmit data comprises causing the at least one wireless communications interface to transmit data indicative of a location of the mobile processor-based device.

23. The method of claim 16 wherein performing at least one anti-theft action comprises:
causing, by the at least one processor, an RF beacon transmitter of the mobile processor-based device to transmit RF beacon signals responsive to the determination that the mobile processor-based device has been removed from the designated area.

24. The method of claim 23 wherein powering at least the beacon network interface comprises powering at least the beacon network interface by the auxiliary power source, and the auxiliary power source comprises at least one of a supercapacitor, a capacitor, or a battery.

25. The method of claim 23, further comprising:
receiving, by a beacon reader disposed outside of the designated area, RF beacon signals from the mobile processor-based device when the RF beacon transmitter of the mobile processor-based device transmits RF beacon signals responsive to the determination that the mobile processor-based device has been removed from the designated area; and
providing, by the beacon reader, an indication of a location of the mobile processor-based device based on the RF beacon signals received from the mobile processor-based device.

26. The method of claim 25 wherein receiving RF beacon signals from the mobile processor-based device comprises receiving RF beacon signals from the mobile processor-based device by at least one of a smartphone, tablet computer, laptop computer, or a stationary beacon reader.

27. The method of claim 16 wherein the primary power source of the mobile processor-based device ceases to provide power to the beacon network interface and the auxiliary power source of the mobile processor-based device provides power to the beacon network interface responsive to the user selecting the off state by removing a battery as the primary power source from a housing for the system.

28. The method of claim 27 wherein providing power to the beacon network interface is switched from the primary power source to the auxiliary power source responsive to the user selecting the off state by removing a battery as the primary power source from the housing for the system.

29. A system to detect unauthorized removal of a mobile processor-based device from a designated area, the system comprising:
a mobile processor-based device, comprising:
a beacon network interface which includes an RF receiver;
a primary power source which provides power to the beacon network interface, at least one processor and at least one nontransitory processor-readable storage medium of the mobile processor-based device;
an auxiliary power source operative to provide power to at least the beacon network interface for a period of time when the primary power source does not provide power to the beacon network interface, wherein providing power to the beacon network interface is switched from the primary power source to the auxiliary power source responsive to detecting that the user selected an off state for the system;
said at least one nontransitory processor-readable storage medium storing at least one of processor-executable instructions or data; and
said at least one processor communicably coupled to the at least one nontransitory processor-readable storage medium and communicatively coupled to the beacon network interface, in operation the at least one processor:
receives, via the RF receiver of the beacon network interface, RF beacon signals from an anti-theft beacon system positioned proximate an exit of the designated area;
determines, by the at least one processor, a trend in receives signal strength indicators (RSSI) of a plurality of RF beacon signals received from the RF transmitter of the anti-theft beacon system;
detects an improved RSSI trend as the mobile processor-based device is moved toward the anti-theft beacon system;
determines that the mobile processor-based device has been removed from the designated area based at least in part on the detected improved RSSI trend; and
performs at least one anti-theft action based at least in part on the determination that the mobile processor-based device has been removed from the designated area,
wherein the RF beacon signals encode reference signal strength information, and the at least one processor of the mobile processor-based device decodes the RF beacon signals to obtain the reference signal strength information and determines a distance between the mobile processor-based device and the anti-theft beacon system based at least in part on the RSSI and the obtained reference signal strength information.

30. The system of claim 1 wherein the primary power source is configured to be removed from a housing for the system, and the auxiliary power source is configured to not be removed from the housing.

31. The system of claim 30 wherein the primary power source is a rechargeable battery.

32. The system of claim 29 wherein the mobile processor-based device is selected from the group consisting of a self-shopping terminal, a smartphone, a tablet computer, a laptop computer, and a wearable device.

33. A system to detect unauthorized removal of a mobile processor-based device from a designated area, the system comprising:
a mobile processor-based device, comprising:
a beacon network interface which includes an RF receiver;
a primary power source which provides power to the beacon network interface, at least one processor and at least one nontransitory processor-readable storage medium of the mobile processor-based device;
an auxiliary power source operative to provide power to at least the beacon network interface for a period of time when the primary power source does not provide power to the beacon network interface;
said at least one nontransitory processor-readable storage medium storing at least one of processor-executable instructions or data; and
said at least one processor communicably coupled to the at least one nontransitory processor-readable storage medium and communicatively coupled to the beacon network interface, in operation the at least one processor:
runs one or more operational applications for a retail location; and runs a beacon processing application in background of the mobile processor-based device that is configured to monitor universally unique identifiers associated with the RF beacon signals for the retail location;

receives, via the RF receiver of the beacon network interface, RF beacon signals from an anti-theft beacon system positioned proximate an exit of the designated area;

determines, by the at least one processor, a trend in receives signal strength indicators (RSSI) of a plurality of RF beacon signals received from the RF transmitter of the anti-theft beacon system;

detects an improved RSSI trend as the mobile processor-based device is moved toward the beacon system;

determines that the mobile processor-based device has been removed from the designated area based at least in part on the detected improved RSSI trend; and performs at least one anti-theft action based at least in part on the determination that the mobile processor-based device has been removed from the designated area, wherein the RF beacon signals encode reference signal strength information, and the at least one processor of the mobile processor-based device decodes the RF beacon signals to obtain the reference signal strength information and determines a distance between the mobile processor-based device and the beacon system based at least in part on the RSSI and the obtained reference signal strength information.

* * * * *